(12) United States Patent
Omernick

(10) Patent No.: US 9,582,149 B2
(45) Date of Patent: *Feb. 28, 2017

(54) SELECTIVE DATA DOWNLOADING AND PRESENTATION BASED ON USER INTERACTION

(71) Applicant: Apple Inc., Cupertino, CA (US)

(72) Inventor: Timothy P. Omernick, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,188

(22) Filed: May 6, 2014

(65) Prior Publication Data

US 2014/0245150 A1   Aug. 28, 2014

Related U.S. Application Data

(63) Continuation of application No. 12/147,692, filed on Jun. 27, 2008, now Pat. No. 8,763,058.

(Continued)

(51) Int. Cl.
*H04N 7/16* (2011.01)
*G06F 3/048* (2013.01)
(Continued)

(52) U.S. Cl.
CPC ........ *G06F 3/0482* (2013.01); *G06F 3/04842* (2013.01); *H04L 67/02* (2013.01);
(Continued)

(58) Field of Classification Search
CPC ................ H04N 21/41407; H04N 21/6131
(Continued)

(56) References Cited

U.S. PATENT DOCUMENTS 5,619,249 A * 4/1997 Billock .............. H04N 7/17318
   348/563
7,426,696 B1 * 9/2008 Hwang .............. H04N 5/44543
   348/E5.105
(Continued)

OTHER PUBLICATIONS

Office Action, dated Mar. 29, 2011, received in U.S. Appl. No. 12/147,692, 14 pages.
(Continued)

*Primary Examiner* — Gigi L Dubasky
(74) *Attorney, Agent, or Firm* — Morgan, Lewis & Bockius LLP

(57) ABSTRACT

Some embodiments of the invention are directed to, among other things, systems, computer readable media, methods and any other means for using a handheld device to present information to a user. The handheld device and server(s) can be configured to differentiate among inexpensive and expensive information. For example, the handheld device can be configured to present media listings that represent media stored on the server(s). Each media listing can include text (inexpensive information) and thumbnails (expensive information). While the user scrolls through the media listings, the new listings can only include text. Once the scrolling stops, the missing thumbnails can be downloaded and integrated into their corresponding listings. In response to a listing being selected, the corresponding media file can be downloaded and/or played back to the user by the handheld device.

12 Claims, 9 Drawing Sheets

Related U.S. Application Data

(60) Provisional application No. 60/937,900, filed on Jun. 28, 2007.

(51) Int. Cl.
*G06F 3/0482* (2013.01)
*H04N 21/24* (2011.01)
*H04N 21/414* (2011.01)
*H04N 21/442* (2011.01)
*H04L 29/08* (2006.01)
*G06F 3/0484* (2013.01)
*H04L 29/06* (2006.01)

(52) U.S. Cl.
CPC ......... *H04L 67/06* (2013.01); *H04N 21/2402* (2013.01); *H04N 21/2407* (2013.01); *H04N 21/41407* (2013.01); *H04N 21/44209* (2013.01); *H04L 65/4084* (2013.01)

(58) Field of Classification Search
USPC .................................. 725/62, 105
See application file for complete search history.

(56) References Cited

U.S. PATENT DOCUMENTS

| | | | |
|---|---|---|---|
| 2005/0149977 A1* | 7/2005 | Nakamura | H04N 5/44543 725/105 |
| 2006/0064716 A1* | 3/2006 | Sull | G06F 17/30793 725/37 |
| 2007/0061748 A1* | 3/2007 | Hirose | 715/764 |
| 2007/0266322 A1 | 11/2007 | Tretter et al. | |
| 2008/0031595 A1* | 2/2008 | Cho | G11B 27/34 386/278 |

OTHER PUBLICATIONS

Final Office Action, dated Sep. 21, 2011, received in U.S. Appl. No. 12/147,692, 17 pages.
Office Action, dated Jul. 18, 2012, received in U.S. Appl. No. 12/147,692, 17 pages.
Final Office Action, dated Jan. 24, 2013, received in U.S. Appl. No. 12/147,692, 11 pages.
Notice of Allowance, dated Feb. 7, 2014, received in U.S. Appl. No. 12/147,692, 12 pages.

\* cited by examiner

700

| | | TITLE | AUTHOR | RATING | # OF VIEWS | POINTER TO VIDEO | POINTER TO THUMBNAIL | ... |
|---|---|---|---|---|---|---|---|---|
| 702a | 1 | DOG ON SKATEBOARD | NAME 1 | 4 | 20 | URL1A TO SERVER A | URL1B TO SERVER B | ... |
| 702b | 2 | SPACE SHUTTLE LANDING | NAME 2 | 3 | 15 | URL2A TO SERVER A | URL2B TO SERVER B | ... |
| 702c | 3 | NEW INVENTIONS | NAME 3 | 3 | 12 | URL3A TO SERVER A | URL3B TO SERVER B | ... |
| 702d | 4 | HYBRID CAR PROTOTYPE | NAME 4 | 4 | 21 | URL4A TO SERVER A | URL4B TO SERVER B | ... |
| | 5 | SCREWDRIVER HOW-TO | NAME 5 | 2 | 2 | URL5A TO SERVER A | URL5B TO SERVER B | ... |
| | 6 | GLOBAL WARNING MAPS | NAME 6 | 4 | 18 | URL6A TO SERVER A | URL6B TO SERVER B | ... |
| | ⋮ | ⋮ | ⋮ | ⋮ | ⋮ | ⋮ | ⋮ | ⋮ |

FIG. 7

SELECTIVE DATA DOWNLOADING AND PRESENTATION BASED ON USER INTERACTION

CROSS-REFERENCE TO RELATED APPLICATION

This application is a continuation of U.S. application Ser. No. 12/147,692, filed on Jun. 27, 2008, which claims the benefit of U.S. Provisional Application No. 60/937,900, filed on Jun. 28, 2007, all of which are hereby incorporated by reference herein in their entirety.

FIELD OF THE INVENTION

The invention includes computer readable media, systems, methods and any other means for selectively downloading data from a server to an electrical device, based on one or more user interactions. The invention can also relate to selectively presenting media information on a display based on a user's interaction with the electrical device and/or various types of the media information.

BACKGROUND OF THE INVENTION

Portable and handheld electrical devices are a staple of modern society. Every day, millions of people use laptop computers, cellular telephones, digital music players and personal data assistants (PDAs). As technology and innovation progress, electrical devices become more portable and processors become faster. As a result, devices have an increasing number of features and more complex menu systems, despite getting smaller, even handheld.

One handheld device was recently lauded as being revolutionary for successfully combining, among other things, a cellular phone, wireless internet connectivity, a media player, and a touch screen. That device is Apple Inc.'s iPhone™. (Apple Inc. owns the iPhone™ trademark.) Although many of the iPhone™'s features had been previously integrated in its larger brethren (some of which were portable but not handheld), the iPhone™ was lauded as revolutionary, largely because Apple Inc. figured out how to integrate those features (in addition to others) in a handheld device.

Despite the improvements in processor and battery power, people often desire handheld devices to act more like their larger brethren. For example, although the iPhone™ can surf the internet and download video, the iPhone™ had a number of limitations due to, e.g., power, memory and possessor constraints that many laptop computers do not have. In other words, despite technology constantly improving, handheld devices may always be less powerful and more limited than larger devices and, therefore, unique solutions tailored to handheld devices need to be found for complex problems, because people will probably desire handheld devices that function like their larger brethren.

For example, obtaining some information and/or types of media from the Internet was expensive (with regards to bandwidth, memory and battery requirements) and limited some devices as to the types of media and information the devices could present for the user. For example, YouTube™ videos could not be viewed by all handheld devices (even those with sophisticated web browsers). (YouTube™ is a trademark owned by Google Inc.) Moreover, even if YouTube™ videos and/or other types of media content (that may be restricted to larger devices, such as Adobe Inc.'s flash content) could be played by all handheld devices, the user experience would probably be drastically different (e.g., slower download, quick draining of the battery, etc.). However, many users happily ignore these limitations, because the users are able to have their favorite content conveniently at hand wherever they go.

SUMMARY OF THE INVENTION

The invention is directed to systems, methods, computer readable media and other means for presenting information to a user. More particularly, some embodiments of the invention are directed to avoiding the wasteful use of processing bandwidth and communications bandwidth when the user is using a handheld device to browse through media listings associated with videos or other media stored on a remote server. For example, the handheld device can present media listings to the user that include both bandwidth-inexpensive information (e.g., text) and bandwidth-expensive information (e.g., graphical data such as a thumbnail images representative of the media). In response to an initial user input to view some of the media listings, the handheld device can download an excess of the inexpensive information (in anticipation of the user deciding to browse through the media listings) without wasting much bandwidth, and only provide expensive information after the device determines the corresponding media listings is actually being displayed to the user. This can allow the handheld device to have improved performance (both user perceived and actual), extended battery life and reduced memory consumption, all of which are important and can be major obstacles when designing a handheld, multifunctional electrical device.

A handheld device can present information to the user after, for example, the device receives a first user input indicating a desire to view a list of videos stored on at least one remote server. In response to receiving the user input, the device can request a first set of text metadata portions associated with at least two videos. For example, the device can request text metadata portions of 50 videos from the at least one remote server. To reduce bandwidth consumption and response time, the device can also request a first set of thumbnail metadata portions, which are associated with a subset of the at least two videos. For example, the device can request thumbnail metadata portions for 10 of the 50 videos. The thumbnail metadata portions can be stored on the same or different servers than the corresponding text metadata portions and/or the media payload data.

In response to the requests, the server(s) can upload the data over, for example, a network to the handheld device. The handheld device can then receive the first set of text metadata portions and the first set of thumbnail metadata portions.

The metadata portions can be used by the handheld device to generate a first display that includes a first set of media listings. Each of the media listings can comprise text information associated with one of the first set of text metadata portions as well as thumbnail information associated with one of the first set of thumbnail metadata portions. The handheld device can then present the first display to a user. The display can be presented by any suitable display component, such as an integrated display screen (e.g., multi-touch display screen) and/or external display device (e.g., television).

The handheld device can receive a second user input while presenting the first display. The user input can cause any number of system commands to be generated. For example, an exit command can be generated in response to the second user input and the device can power OFF or exit the mode of operation. As another example, the device can determine that the second user input is a selection of a media listing included in the first set of media listings. For example, the device can detect a tap touch event on its multi-touch display screen. In response, the handheld device can request payload data associated with the media listing from the appropriate remote server(s).

The remote server(s) can then provide the payload data to the handheld device. Upon receiving the payload data, the handheld device can, for example, receive the payload data (using its communications circuitry), store the data in local memory and play back video information associated with the payload data. As another example, the handheld device can receive and playback the corresponding video in a streaming manner.

In addition to receiving a playback command while displaying media listings, the handheld device can also be configured to receive a browse command. For example, the handheld device's multi-touch display screen can generate a browse command in response to detecting a scrolling touch event. In response to the browse command, the handheld device can enter a browse mode. The browse mode can be an active mode. From the user's perspective, it can look like a free-scrolling list of selectable options that has a decreasing acceleration until eventually stopping.

To provide active browse displays, the handheld device can generate a number of additional displays that each include one or more additional media listings. The additional media listings can comprises text information associated with one of the first set of the text metadata portions and omit new thumbnail information associated with new thumbnail metadata portions. One or more of the additional displays can also include both old media listings (which have expensive and inexpensive information) and new listings (which have inexpensive information and omit expensive information).

Once the handheld device exits the active browsing mode (in response to, e.g., a user input or a period of time elapsing), the device can enter a rest mode. The handheld device can then generate a second display that includes a second set of media listings. The second display can be generated in response to entering the rest mode or in response to determining the handheld device has been in the rest mode for a predetermined period of time.

The second display can include text information associated with one of the text metadata portions (e.g., one of the original 50) and initially omit new thumbnail information associated with new thumbnail metadata portions (e.g., not one of the original 10). While the second display is being presented to a user by the handheld device, the handheld device can be requesting and receiving the new thumbnail metadata portions from the server(s). The new thumbnail metadata portions can then be used to update the second display to include the new thumbnail information associated with the second set of thumbnail metadata portions.

BRIEF DESCRIPTION OF THE DRAWINGS

The above and other features of the invention, its nature and various advantages will be more apparent upon consideration of the following detailed description, taken in conjunction with the accompanying drawings in which:

FIG. 7 is an illustrative metadata database in accordance with one embodiment of the present invention.

DETAILED DESCRIPTION OF THE INVENTION

Figure 1:
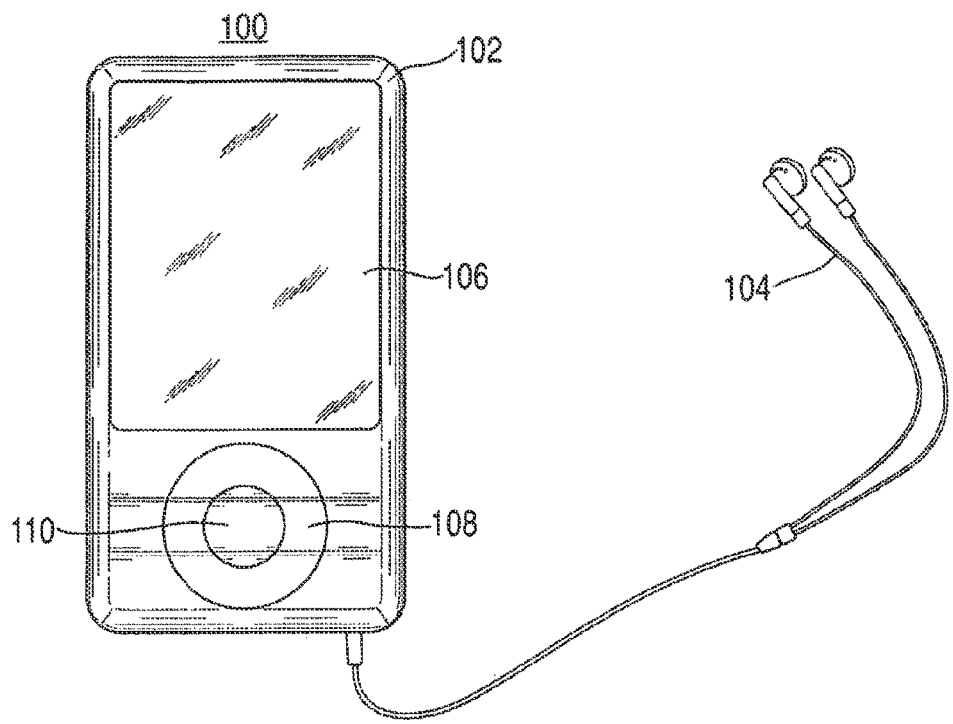
FIGS. 1-2 show exemplary systems in accordance with some embodiments of the present invention.

The invention can enable a electrical device to download and browse through very large media libraries on a memory, power and/or bandwidth limited electrical device, such as a mobile, handheld electrical device. As sometimes used herein, a media library is a collection of library entries. Each library entry can include a payload data portion (e.g., a media file, such as a YouTube™ video) and corresponding metadata that can be used to generate information describing the payload data portion (e.g., descriptive information, such as a title of a video and/or at least one thumbnail picture or short video clip that is representative of the video).

A data portion of metadata that requires a relatively substantial amount of power, bandwidth and/or memory to process is sometimes referred to herein as an expensive data portion. A data portion of metadata that requires substantially less amounts of power, bandwidth and/or memory is referred to herein as an inexpensive data portion. For example, today, expensive data for a portable electronic media player can be image and/or video data downloaded over a wireless network, whereas the related text data downloaded onto the same device over the same network is considered herein to be inexpensive data. One skilled in the art would appreciate that these terms (i.e., expensive data and inexpensive data), in addition to being relative to each other, are relative to the device(s), system(s), and/or network(s) being used and will change as power (e.g., battery power), bandwidth (e.g., wireless networking bandwidth) and memory (e.g., RAM) capacities increase, as well as become more affordable and widely available, over time.

Instead of requiring that an entire library entry (i.e., its payload data and all metadata associated with the payload data) be downloaded to an electrical device and presented to a user, an electrical device in accordance with the invention can be configured to receive and present only certain data portions of the library entry based on a user's interaction(s) with and/or automated functions of the electrical device and/or other network device, server, etc. The certain data portions of the library entry downloaded to a device can include, for example, inexpensive data portions and omit (at least initially) the downloading of the expensive metadata. The downloading of the expensive metadata can occur in response to, for example, the device detecting that its user interface is in a rest state.

Thus, if the electrical device detects that its media listings (e.g., any data associated with one or more library entries as displayed in a list by the device) are in an active state (e.g., a state in which the user is interacting with the electrical device in one or more predetermined ways to change which media listings are being displayed or highlighted), the electrical device can, for example, refrain from downloading the expensive data or payload data associated with those listings from the server or refrain from displaying the expensive data or payload data to the user, because the user may not be interested in the media listing associated with that data. However, once the electrical device detects that its media listings is at a rest state (e.g., a state in which the user is no longer interacting with the electrical device in one or more predetermined manners that change which media listings are being displayed), the electrical device can download and present the expensive data and/or payload data corresponding to the media listings currently displayed.

FIG. 1 shows system 100, which can be operated in accordance with some embodiments of the present invention. System 100 includes handheld device 102 and accessory device 104.

Handheld device 102 can be used to download media (e.g., music, images, video, etc.), generate media (e.g., take pictures, record audio, etc.), access the Internet, take notes, organize appointments, present media (e.g., play video, display images, emit audio, etc.), perform any other function and/or combination thereof. One or more additional accessory devices (not shown), such as a wireless headset and/or remote control, can also be included in system 100. Handheld device 102 is illustrated as an iPod™, but one skilled in the art will appreciate that handheld device 102 can be any type of electrical device.

Handheld device 102 includes display component 106. As illustrated in FIG. 1, display component 106 can be a display screen that is integrated into handheld device 102. Display component 106, like any other component discussed herein, does not have to be integrated into handheld device 102 and can be external to handheld device 102. For example, display component 106 can be a computer monitor, television screen, and/or any other graphical user interface, textual user interface, or combination thereof.

Display component 106 enables handheld device 102 to present displays to a user. The displays can include various types of information and selectable options. For example, a display can include media or information about media that is being played back or can be played back. The displays can also include information downloaded from the Internet, contact information, map information or any other type of information. The information can be interactive and responsive to user inputs. In addition, the displays presented by display component 106 can include selectable options that allow a user to navigate the menu hierarchy and utilize the features implemented by handheld device 102. Additional examples of displays are discussed below in connection with, e.g., FIGS. 5A-C.

User input component 108 is illustrated in FIG. 1 as a click wheel. User input component 108 (in combination with its driver circuitry, discussed below) can be used to convert one or more touch inputs into electrical signals, and can cause handheld device 102 to generate and execute one or more executable commands. The center portion of input component 108 can be button 110. Button 110 can be pressure sensitive, touch sensitive, a proximity sensor, and/or any other type or combination of button or input component. For example, user input component 108 can be used to control handheld device 102, interact with the menu hierarchy implemented on handheld device 102, browse one or more media listings, select one or more media listing(s), and/or instruct handheld device 102 to perform any function it is configured to perform.

One skilled in the art will appreciate that user input component 108 can be replaced by or used in conjunction with any type of user input device(s) that receive a user input and, in response, facilitates the creation of one or more corresponding electrical signals. One skilled in the art will also appreciate that user input component 108 and/or any other input component can be integrated into and/or located external to handheld device 102. For example, one or more user input components can also be, or include, at least one mouse, keyboard, trackball, slider bar, switch, button (such as button 110), number pad, dial, or any combination thereof.

Another example of a user interface component is a multi-touch display screen such as that discussed below in connection with, e.g., FIG. 2 and described in commonly assigned Westerman et al., U.S. Pat. No. 6,323,846, issued Nov. 27, 2001, entitled "Method and Apparatus for Integrating Manual Input," which is incorporated by reference herein in its entirety. User input component 108 may emulate a rotary phone or a multi-button electrical device pad, which may be implemented on a touch screen or the combination of a click wheel or other user input device and a screen. A more detailed discussion of such a rotary phone interface may be found, for example, in McKillop et al., U.S. patent application Ser. No. 11/591,752, filed Nov. 1, 2006, entitled "Touch Pad with Symbols based on Mode," which is incorporated by reference herein in its entirety.

Accessory device 104 is shown in FIG. 1 as being a stereo headset that is physically and electrically coupled to handheld device 102 via connector components (not shown) that are integrated into both accessory device 104 and handheld device 102. Accessory device 104 can also include one or more buttons and/or other input components (not shown). For example, accessory device 104 can include a switch.

In other embodiments, one or more wireless accessory devices can be electrically coupled to handheld device 102. Accessory device 104 can then, for example, act as a remote control and be used to wirelessly navigate and control handheld device 102. Handheld device 102 and accessory device 104 can exchange any type of data using any protocol (such as, e.g., BlueTooth™) and can pair together automatically. Automatic BlueTooth™ pairing is discussed in more detail in commonly assigned Tang et al., U.S. patent application Ser. No. 11/823,923, filed Jun. 28, 2007, entitled "Apparatuses and Methods that Facilitate the Transfer of Power and Information Among Electrical Devices," which is incorporated by reference herein in its entirety.

Figure 2:
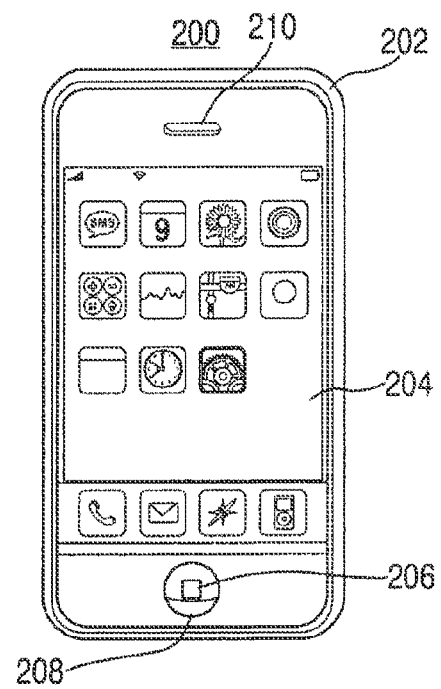

FIG. 2 shows computer system 200 which can also be used in accordance with the present invention. Computer system 200 includes electrical device 202, which is shown in FIG. 2 as an iPhone™. As such, electrical device 202 can function as, among other things, a portable media player, communications device, personal organizer, web browser, and GPS device. One skilled in the art will appreciate that electrical device 202 can be any type of electrical device and be coupled to and used with any type of accessory device without departing from the spirit of the invention.

Electrical device 202 comprises user interface component 204. User interface component 204 is shown in FIG. 2 as a multi-touch screen that can function as both an integrated display screen (the same as or similar to display 106 described above) and an input device that can receive touch events. For example, the display shown in FIG. 2, as being presented by user interface component 204, can be a Main Menu display that is presented when the device is activated or in response to button 206 being depressed. In response to user interface component detecting a tap (or other predefined) touch event in proximity to one of the icons, device 200 can initiate communications with another device (e.g., remote server) and download data (e.g., metadata and/or payload data). Multi-touch display screens are discussed in more detail in commonly assigned U.S. Patent Publication No. U.S. 2006 0097991, entitled "MULTIPOINT TOUCH-SCREEN," which is incorporated herein by reference in its entirely. Electrical device 202 can also include one or more other user interface components, such as button 206, which can be used to supplement user interface component 204.

Microphone 208 and audio output 210 are respective examples of other input and output components that can be integrated into electrical device 202 or any other device discussed herein. Microphone 208 is preferably a transducer that can capture analog audio signals and convert them into digital signals.

Audio output 210 is shown as being a speaker integrated into electrical device 202, but one skilled in the art will appreciate that audio output 210 may also comprise an external device (such as headphones not shown) and/or one or more connector(s) used to facilitate the playing back of audio content and/or the audio portion of video content.

Figure 3:
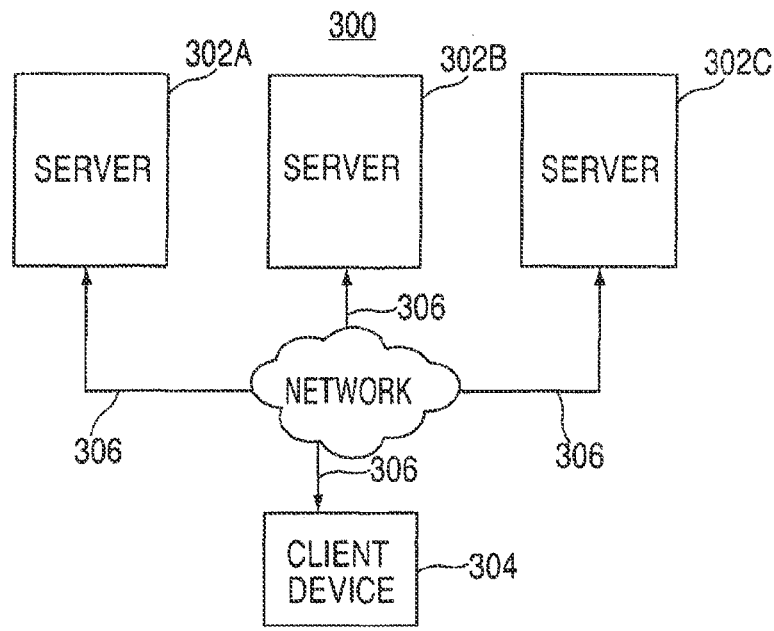
FIG. 3 shows an exemplary schematic of an exemplary data system in accordance with some embodiments of the invention.

FIG. 3 illustrates a schematic view of an illustrative data system in accordance with one embodiment of the present invention. Data system 300 can include one or more servers 302A-302C and client device 304. In some embodiments, servers 302A-302C can be consolidated into fewer servers or expanded to include additional servers. In some embodiments, data system 300 also can include several client devices 304.

Servers 302A-302C can store, among other things, media libraries with library entries that client device 304 can access. To affect a data exchange, client device 304 can issue data download requests to servers 302A-302C. Responsive thereto, servers 302A-302C can locate and transmit the requested data. Servers 302A-302C and client device 304 can communicate over communications link 306. Communications link 306 can include any suitable wired or wireless communications link(s), or combinations thereof, including a network (e.g., the Internet), by which data may be exchanged between servers 302A-302C and client device 304. For example, communications link 306 may include a satellite link, a fiber-optic link, a cable link, an Internet link, or any other suitable wired or wireless link(s). Communications link 306 may transmit data using any suitable communications protocol supported by the medium (or media) of communications link 306. Such communications protocols may include, for example, Wi-Fi (e.g., a 802.11 protocol), Ethernet, Bluetooth (registered trademark), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Servers 302A-302C can include any suitable server for providing data to client device 304. For example, servers 302A-302C can include a file server, a database server, a web server, an FTP server, a VPN server, a proxy server, or any other server operative to provide data to client device 304. In some embodiments, servers 302A-302C can include a media server operative to provide media to client device 304 (e.g., a YouTube™ server, operative to provide video payload files and associated metadata to a client device). (YouTube™ is a trademark owned by Google Inc.)

Client device 304 can include any electrical device operative to communicate with a server. For example, client device 304 may include a media player such as handheld device 102 (of FIG. 1), an advanced cellular telephone such as electrical device 202 (of FIG. 2), a pocket-sized personal computer such as an iPAQ Pocket PC available by Hewlett Packard Inc., of Palo Alto, Calif., a personal digital assistants (PDA), a desktop computer, a laptop computer and any other device capable of communicating via wires or wirelessly (with or without the aid of a wireless enabling accessory system, such as an Apple TV™, marketed by Apple Inc. of Cupertino, Calif.).

Figure 4:
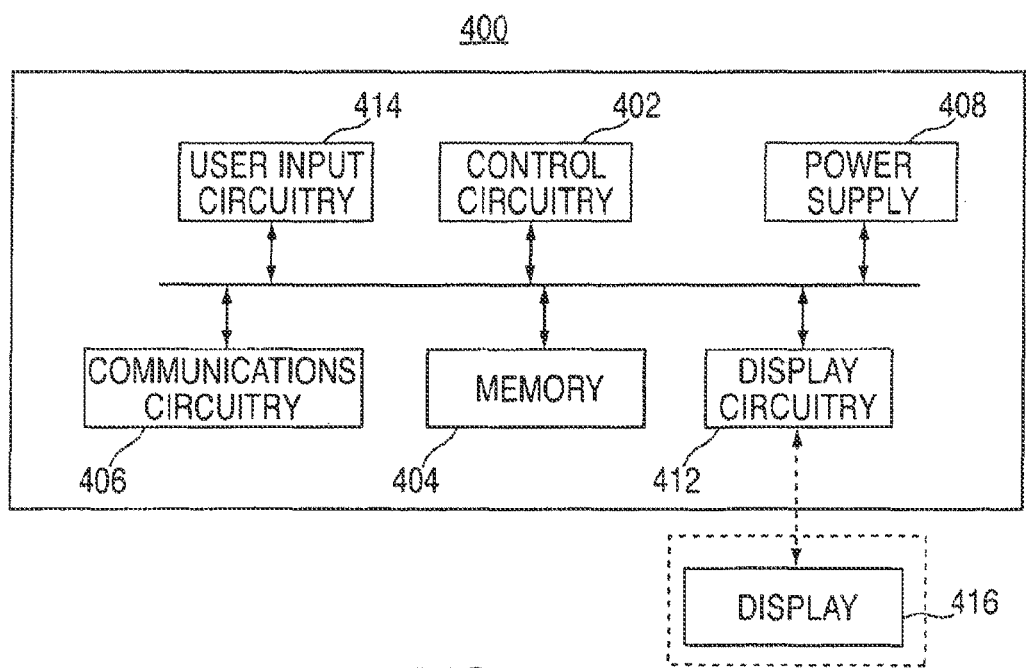
FIG. 4 shows a simplified block diagram of circuitry that can be integrated into an apparatus in accordance with some embodiments of the invention.

FIG. 4 illustrates a simplified block diagram of an illustrative client device in accordance with one embodiment of the present invention. Client device 400 can include control circuitry 402, local client memory 404, communications circuitry 406, power supply 408, bus 410, display circuitry 412, user input circuitry 414, and display device 416. In some embodiments, client device 400 can include more than one of each component, but for the sake of illustration, only one is shown in FIG. 4.

Memory 404 can include one or more storage mediums, including for example, a hard-drive, flash memory, permanent memory such as ROM, semi-permanent memory such as RAM, any other suitable type of storage component, or any combination thereof. Memory 404 can include cache memory, which may be one or more different types of memory used for temporarily storing data for electrical device applications. Memory 404 may store media data (e.g., music and video files), software (e.g., for implementing functions on device 400), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 400 to establish a wireless connection), subscription information (e.g., information that keeps track of podcasts or television shows or other media a user subscribes to), contacts information (e.g., telephone numbers and email addresses), calendar information, any other suitable data, or any combination thereof.

In some embodiments, memory 404 may store authentication information for a user to enter prior to accessing the functionality of the device. For example, memory 404 may store username and password combinations, or algorithms and keys for authenticating a string entered by the user (e.g., using a RSA algorithm). Memory 404 may store data for pairing itself or communicating with one or more devices (e.g., servers 302A-302C of FIG. 3) using a short-range communications protocol.

Communications circuitry 406 can permit device 400 to communicate with one or more servers (e.g., servers 302A-302C of FIG. 3) using any suitable communications protocol. For example, communications circuitry 406 may support Wi-Fi (e.g., a 802.11 protocol), Ethernet, Bluetooth (registered trademark), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Power supply 408 can provide power to the components of device 400. In some embodiments, power supply 408 can be coupled to a power grid (e.g., a personal computer). In some embodiments, power supply 408 can include one or more batteries for providing power in a portable device. As another example, power supply 408 can be configured to generate power in a portable device from a natural source (e.g., solar power using solar cells).

Bus 410 can provide a data transfer path for transferring data to, from, or between control circuitry 402, memory 404, communications circuitry 406, display circuitry 412, and user input circuitry 414.

Display circuitry 412 can accept and/or generate signals for presenting media information (textual and/or graphic) on display device 416. For example, display circuitry 412 can include a coder/decoder (CODEC) to convert digital media signals into analog signals. Display circuitry 412 also can include display driver circuitry and/or circuitry for driving display driver(s). The display signals can be generated by control circuitry 402 and/or display circuitry 412. The display signals can provide media information related to media data downloaded from servers 302A-302C. In one embodiment, display device 416 can be integrated with or externally coupled to client device 400.

Client device 400 also can be equipped with user input circuitry 414 that permits a user to interact or interface with client device 400. For example, user input circuitry 414 can take a variety of forms, such as a button, electronic device pad, dial, click wheel, multi touch screen, touch pad, any other input component circuitry, or any combination thereof. User input circuitry 414 may emulate a rotary phone or a multi-button electronic device pad, which may be implemented on a touch screen.

Figure 5A:
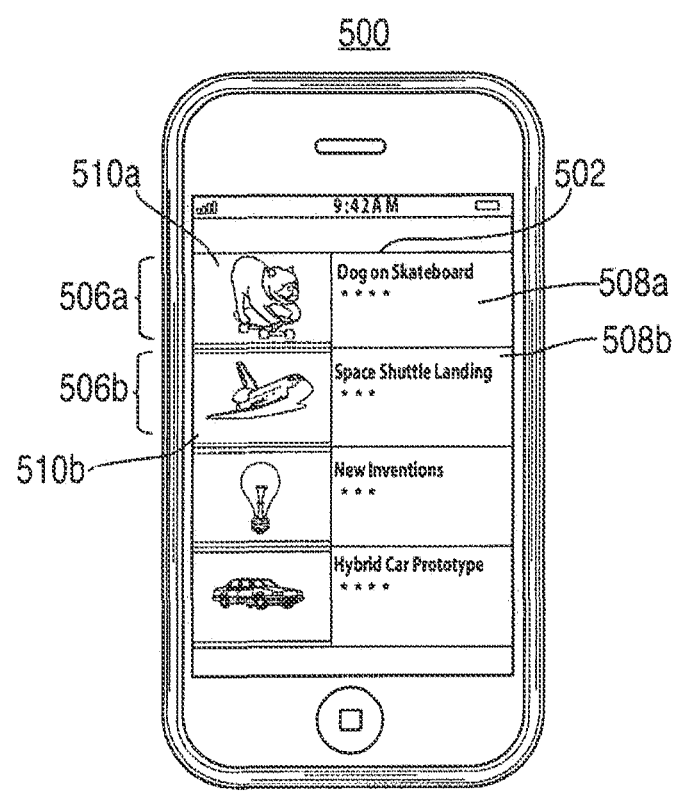
FIGS. 5A-5C show exemplary displays that selectively include media information on a display screen in accordance with some embodiments of the invention.
Figure 5B:
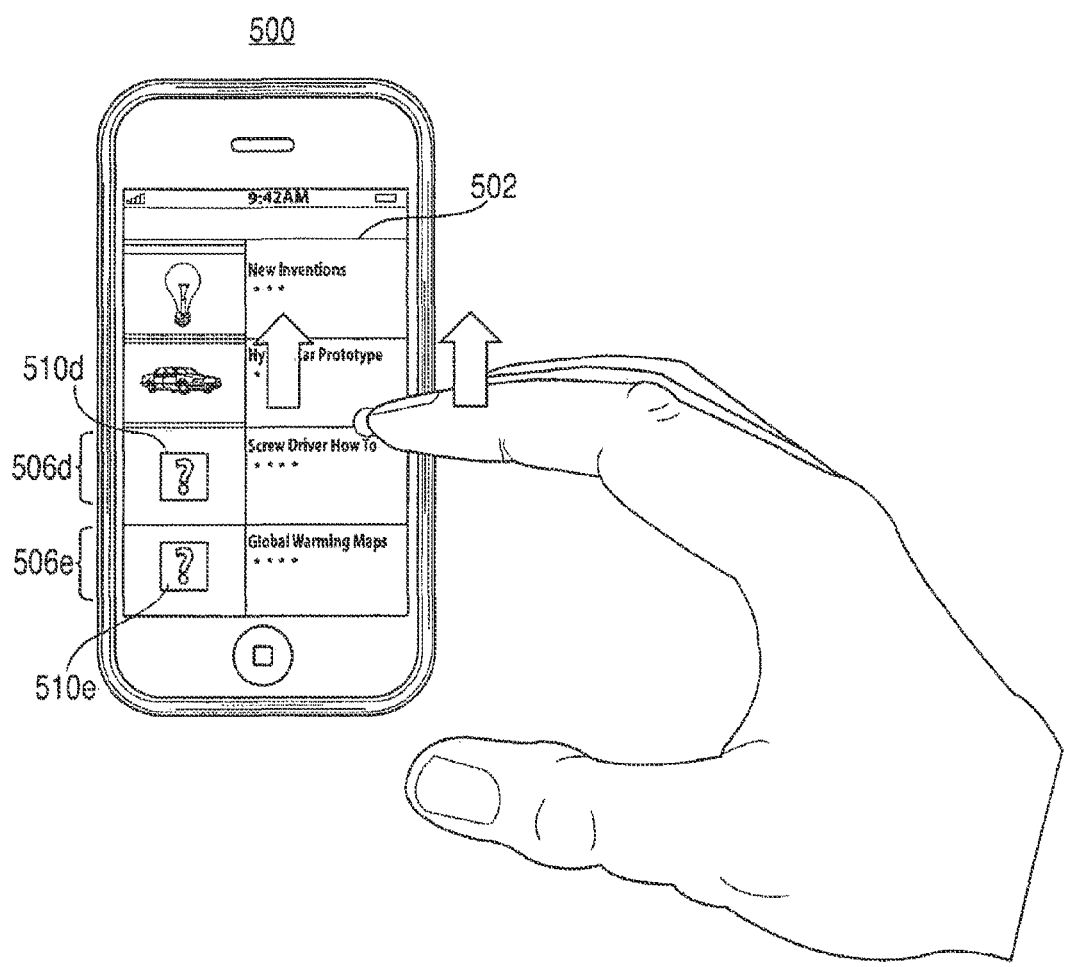
Figure 5C:
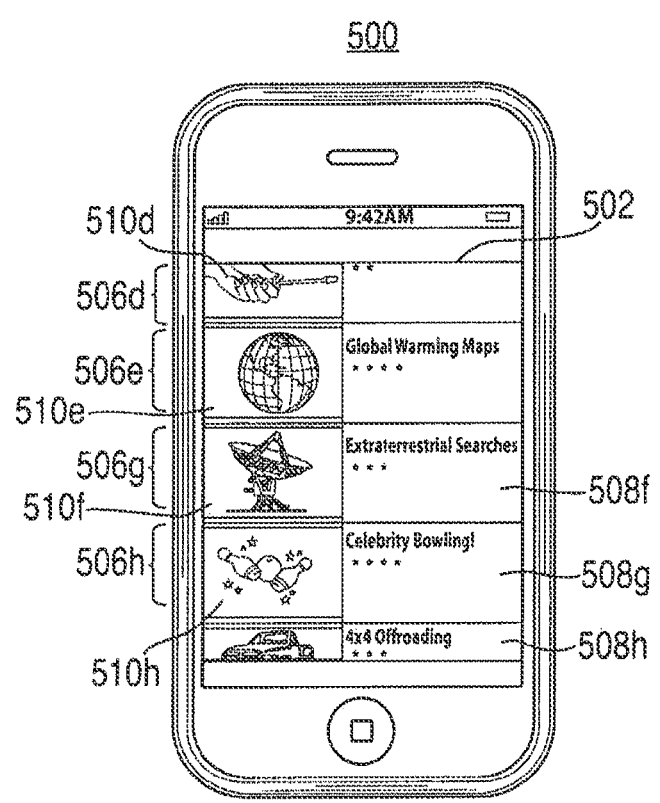

FIGS. 5A-5C show exemplary displays that can selectively present media information on a display in accordance with some embodiments of the invention. Although client device 500 is shown as appearing similar to electrical device 202 of FIG. 2, one skilled in the art will appreciate that client device 500 can be any device that is coupled to another device via wired and/or wireless communications path(s). (Wired, as used herein, includes any type of physical connection, such as, e.g., metal wire(s), fiber optic cable, etc.) For example, client device 500 can function as a cellular telephone and have a multi-touch display screen, such as display 502, as its primary user input component. Display 502 can accept user input (by detecting and receiving touch events) from the user as well as present textual, graphic and/or other visual information to the user.

In accordance with some embodiments of the invention, client device 500 can permit a user to download and browse through a large media library that is partially or fully disposed on one or across a plurality of servers. The media library can contain any number of library entries, wherein each library entry can be associated with both metadata and payload data. In accordance with the invention, a client device can communicate with the server(s) and download all the metadata (e.g., expensive metadata portions and inexpensive metadata portions) or a subset of the metadata (e.g., just the inexpensive metadata portions or the expensive metadata portions) associated with each of the library entries in the media library. When downloading only a subset of the metadata, the client device and server(s) can be configured to delay the downloading of expensive metadata portions and/or the payload data associated with a library entry, until the client device receives an indication of a user's desire to access specific expensive metadata portions and/or payload data.

For example, when the user is browsing or scrolling through displayed media listings associated with certain library entries from the media library, the invention can refrain from using bandwidth to transfer expensive metadata portions (e.g., graphical data, such as a thumbnail picture representative of video payload data), thereby also refraining from presenting those expensive metadata portions as part of the media listings to the user. This can improve the client device's performance (both user perceived and actual), extend battery life and reduce memory consumption and requirements. All of which can be major obstacles when designing a handheld, multifunctional electrical device.

FIG. 5A shows display 502, which is an exemplary graphic user interface (GUI) that can be initially presented by client device 500 in response receiving an initial user input to view at least one media library file. Display 502 can present the media library as a list of one or more media listings 506a, 506b, etc. The client device 500 and/or the server (providing the metadata and/or payload data) can be configured to automatically transfer a number of listings' inexpensive metadata portions (e.g., wherein the number is more than what can be displayed at any one time by client device 500). Client device 500 can also be configured to automatically present information generated from some of the listings' inexpensive metadata portions, such as listing portions 508a, 508b, etc., to a user.

The invention enables the expensive metadata to be downloaded and processed into presentable information independent from the inexpensive metadata. For example, the textual metadata (which can be a form of inexpensive metadata) associated with each of media listings 506a, 506b, etc. can be processed and presented as textual information in response to the initial user input. This can enable a user to quickly see such information as the title, director and/or any other textual representation of each media's payload data. Client device 500 and/or the server can refrain, however, from transferring the expensive metadata portions that corresponds to the expensive listing portions 510a, 510b, etc. For example, graphical information that is generated based on graphic metadata portions can be (at least) initially omitted from display 502, and only downloaded and presented as information in response to one or more subsequent user inputs. As another example, only some expensive metadata portions, such as those associated with listing portions 510a, 510b, etc. can be automatically downloaded, in response to determining that they are to be included in the initial display. In this manner, only the expensive metadata that can be at least partially used in a display, is downloaded initially and the corresponding thumbnails (or other visual representation of the payload data) are presented, in response to the initial user input.

In accordance with some embodiments of the invention, FIG. 5B illustrates what client device 500 can display in response to a user input to scroll through listings that client device only has received the corresponding inexpensive metadata (and not the expensive metadata). By providing such scrolling functionality, client device 500 can permit a user to quickly and efficiently browse the contents of a large media library without dedicating large amounts of battery power, memory and bandwidth to the operation, all of which can slow the process down and lead to a less favorable user experience. For example, in response to client device 500 determining the user would like to browse (e.g., in response to receiving a scrolling touch event) through media listings, client device 500 can update display 502, by replacing media listings 506a and 506b with new media listings 506d and 506e. In other words, FIG. 5A can be initially presented in response to, e.g., the initial user input (e.g., receiving an indication of a desire to access content stored in at least one remote media library by, e.g., receiving a tap touch event in a Main Menu display, such as that shown in FIG. 2). FIG. 5B can be subsequently presented in response to a user input to browse (e.g., receiving a scrolling touch event). As shown by FIG. 5B, while client device 500 is in an active browse mode (e.g., while the listings are scrolling as indicated by the upwards motion arrow of FIG. 5B), client device 500 and/or the server(s) can refrain from updating and/or uploading the expensive metadata portions that correspond with listing portions 510d and 510e, which are associated with media listings 506d and 506e, respectively.

However, in response to determining that the active browsing has stopped (e.g., the scrolling has ceased and display 502 appears stationary to the user for at least a predetermined period of time), as shown in FIG. 5C, client device 500 can automatically download the expensive metadata portions (associated with expensive listing portions 510d, 510e, 510f, 510g and 510h, and complete new listings 506d, 506e, 510f, 510g and 510h. Display 502 can then be automatically updated to include the information represented by inexpensive listing portions 508d, 508e, 508f, 508g and 508h as well as expensive listing portions 510d, 510e, 510f, 510g and 510h. In some embodiments, the inexpensive listing portions 508f, 508g and 508h were generated based on previously downloaded metadata portions, such as in response to the initial user input.

Some embodiments of the invention, as shown in FIG. 5C, include client device 500 being programmed to automatically present parts of information generated from inexpensive and expensive metadata portions, even when the corresponding media listings are only partially shown on display 502, such as the parts of listings 506d and 506h of FIG. 5C. Accordingly, as shown in the sequence represented by FIGS. 5A-C, client device 500 can be programmed to initially and/or independently request inexpensive metadata for more listings than can be displayed at one time, and only request expensive metadata for the listings that have already been displayed for at least a period of time.

Figure 6A:
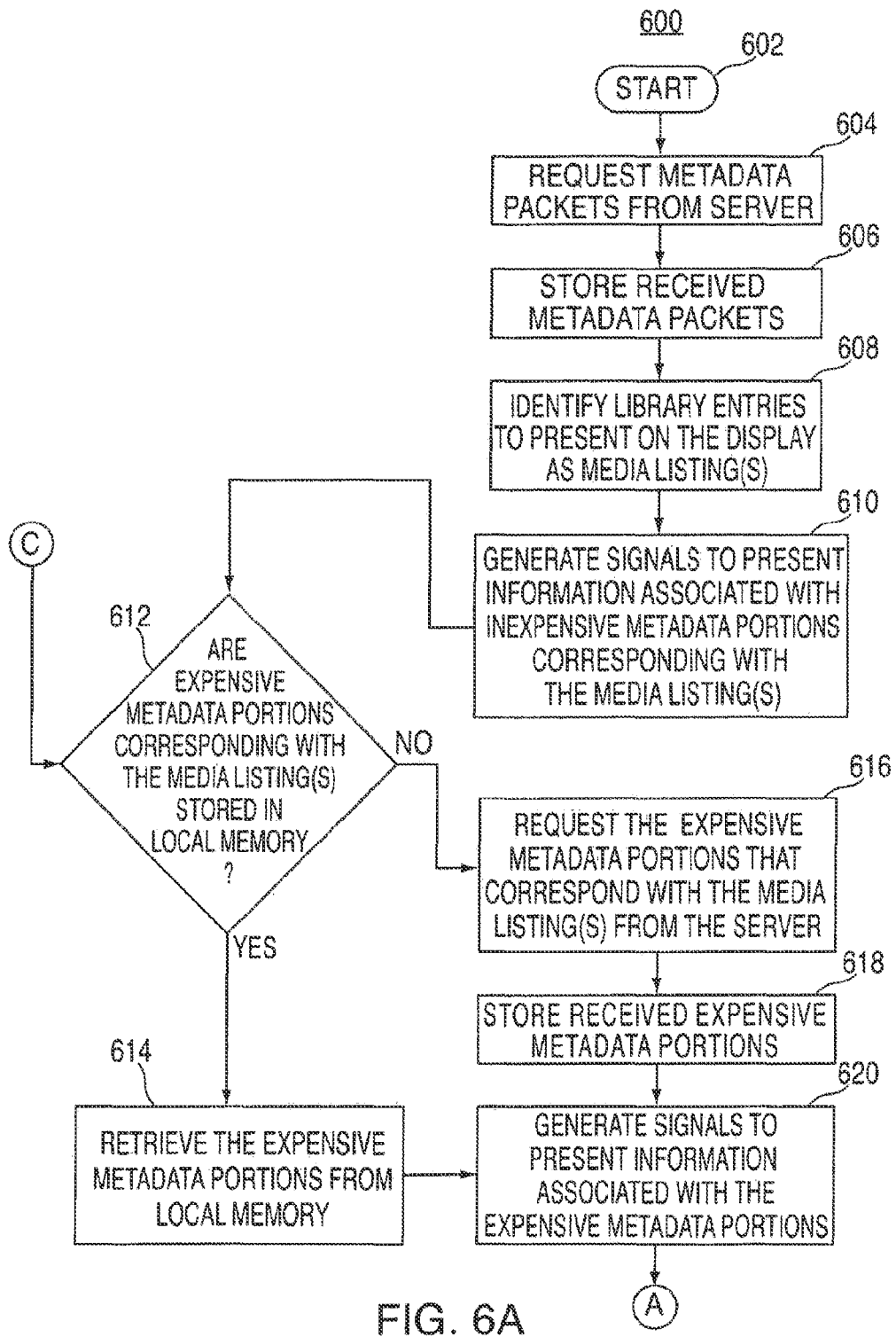
FIGS. 6A-6C shows a flowchart of an illustrative process for selectively downloading data from a server and selectively showing data on a display in accordance with one embodiment of the present invention.
Figure 6B:
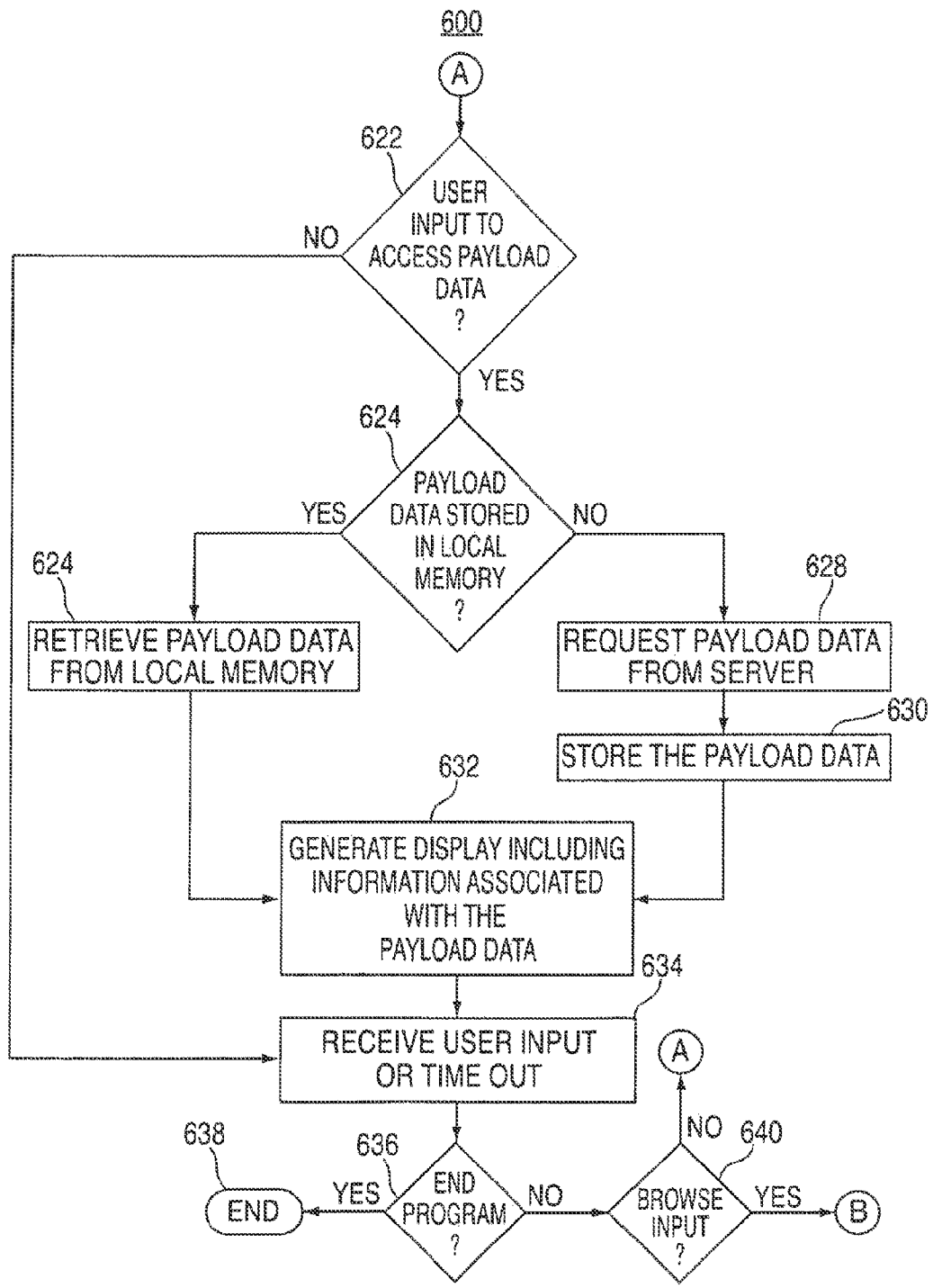
Figure 6C:
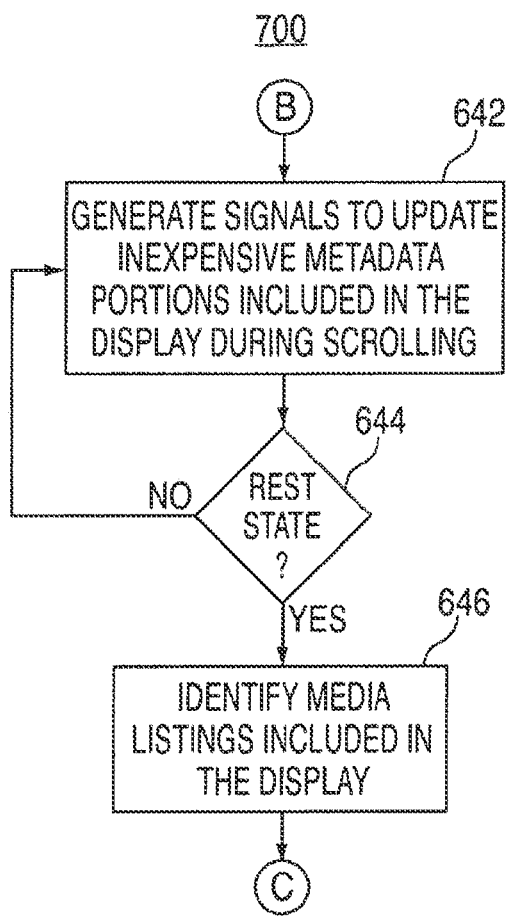

FIGS. 6A-6C is a flowchart of process 600 that shows further examples and, in some instances, additional details of the sequence represented by FIGS. 5A-C. Process 600 includes methods for selectively downloading metadata from a server and selectively showing graphic media data on a display of a client device in accordance with some embodiments of the invention.

Process 600 starts at step 602 of FIG. 6A in response to, for example, the user selecting a web media option included in a main or home menu screen (not shown).

Process 600 then proceeds to step 604. At step 604, the client device can request (and subsequently receive) any number of metadata packets from at least one server. This number may be predetermined based on, for example, the number of listings the client device is configured to display concurrently. Each metadata packet can include metadata about one payload data (e.g., one video or other media file) in the media library. Each library entry in the library may include at least one metadata packet and its associated payload data. Each metadata packet can, for example, contain one or more of the following types of metadata portions: inexpensive metadata portions (corresponding with, e.g., a title of media, author, rating, number of views, a pointer to the associated payload data, a pointer to associated expensive metadata portions, any other relatively small suitable parameter, or any combination thereof) and/or expensive metadata portions (corresponding with, e.g., an image representative of the associated payload data, any other relatively large suitable parameter, or any combination thereof). The metadata packets can be stored in a metadata database discussed in greater detail below in connection with, e.g., FIG. 7.

In step 606, the client device can store in its local memory (e.g., memory 404 of FIG. 4) the metadata packets it requested and received from the server(s). The metadata packets can then be accessed more quickly (as compared to downloading them from a remote storage device) when the packets are needed at a later time. For example, the client device can request and store 10 metadata packets containing both expensive and inexpensive metadata as well as 40 other metadata packets containing only inexpensive metadata. By being able to request specific types of metadata packets that contain some or all of the metadata associated with a payload data, the client device can be configured (e.g., automatically, by the user and/or by a software/firmware update) to strike the most efficient balance between download time and interface response time.

Next is step 608, at which the client device can identify a number of library entries to concurrently show on a display as media listings. This number may be predetermined (e.g., automatically, by the user and/or by a software/firmware update). For example, client device 500 of FIG. 5 is shown as being configured to concurrently show 4 media listings.

In step 610, the client device can generate signals to show one or more inexpensive metadata portions on the display as media listings that correspond to the library entries identified in step 608. The signals can be generated based on the metadata retrieved in step 604 that correspond to the library entries.

In step 612, the client device can determine whether any expensive metadata portions corresponding to the identified media listings are stored in its local client memory. If so, in step 614, the client device can retrieve the stored expensive metadata portions from the local client memory. If not, in steps 616 and 618, the client device can request and receive the expensive metadata portions from the server(s) and thereafter, at step 618, store them in its local memory.

At step 620, the client device can generate signals to present the retrieved expensive metadata portions in a display. For example, the client device can present a display similar to display 502 of FIG. 5A.

In some embodiments of the invention, the metadata packets retrieved in step 604 can include pointers to the location in which expensive metadata portions (and payload data, as described below) are stored on the server(s). In response to determining that the expensive metadata portions are not stored in local memory, at step 616, the client device can use the pointers in the metadata packets of the library entries/media listings identified in step 608 to retrieve corresponding expensive metadata portions from the server. Process 600 would then proceed to step 620 discussed above.

After step 620, process 600 proceeds to step 622 of FIG. 6B, at which the client device can determine whether the user has indicated a desire to access the payload data associated with any media listing currently shown on the display. For example, the client device can be configured so that, when the user selects either an inexpensive metadata portion or an expensive metadata portion of a displayed media listing corresponding to a library entry, the client device accepts that media listing as a user-indication for access to the payload data associated with that media listing.

In response to the client device determining at step 622 that the user wants to access a payload data portion (e.g., based on user inputs generated by one or more input components), the client device can check whether the requested payload data portion is stored in the local client memory at step 624.

The client device can determine at step 624 that the payload data is stored in local memory and, at step 626, retrieve the video from the local memory. In response to the client device determining at step 624 that the payload data is not stored in local memory, the client device can request and receive the payload data portion from the server(s) at step 628. At step 630, the payload data can be stored in the local client memory.

In some embodiments of the invention, the metadata packets retrieved in step 604 can include pointers to the location in which the payload data portions are stored on a server. So, at step 628, the client device can use the pointers in the metadata packets of the library entries identified in step 608 to retrieve corresponding payload data portions from the server.

Step 632 follows both step 626 and step 630 in process 600. At step 632, the client device can generate signals to present the retrieved payload data portion in a display on a display screen. At step 634, the client device can accept at least one user input indicative of the user's desire to exit the presentation of the payload data portion on the display (e.g., in response to receiving an exit or home menu command). At step 634, the client device can also time out in response to not receiving any user input and/or any automatically generated input. Step 634 can also follow step 622 in response to the client device determining that the user input does not correspond to a command to access payload data.

At step 636, the client device can determine whether the user wants to close the library connection and end the media program. For example, the client device can determine this in response to detecting a corresponding user input or after a predetermined time between user inputs or any other device events. If the client device determines that the user wants to close the library connection, the client device ends process 600 at step 638. However, in response to the client device determining that the user does not want to close the library, the client device can proceed to step 640.

At step 640, the client device can determine whether the user wants to browse the media listings (e.g., by detecting a scrolling touch event or other user input signal from one or more user input components). If the client device does not detect the user's desire to browse through the media listings, the client device can revert back to a previous step, such as, e.g., step 622. However, in response to the client device determining that it received a browse command, the client device can generate signals to update the inexpensive metadata portions for the media listings shown on the display (as shown in FIG. 5B, for example).

In accordance with some embodiments of the invention, the client device can refrain from downloading additional expensive metadata portions from the server as well as refrain from presenting those expensive metadata portions to the user while the user is browsing through the media listings. Advantageously, this can improve the performance of the client device by reducing the use of processing resources, depletion of battery power and memory requirements. In response to the client device determining at step 640 that it is about to or is currently browsing through media listings corresponding to library entries for which metadata packets have not been downloaded from the server, process 600 can proceed to step 642 of FIG. 6C.

At step 642, the client device can retrieve inexpensive metadata packets from local memory, while in active browse mode, and use them to generate display signals (used to control at least one display screen) to update the information presented to the user. As shown by, for example, FIG. 5A-B.

At step 644 the client device determines whether the active browsing is finished (and the media listings have ceased moving for a period of time, such as 1 second). In response to determining that the browse state is still active, process 600 returns to step 642. In response to the client device determining that its display is in a rest state, process 600 proceeds to step 646. In some embodiments of the invention, a rest state can correspond to a state in which the set of specific media listings being displayed is not/no longer changing. The rest state also can correspond, for example, to a state in which the client device has not detected a predetermined user interaction for a predetermined amount of time. The rest state also can correspond, for example, to a state in which the client device has not detected any other type of predetermined device event.

At step 646, the client device can identify the media listings that currently are being shown to the user in the rest state. Alternatively, the client device may have kept track of these media listings during the time that the user was browsing or scrolling through the library. Thereafter, process 600 returns to step 612.

FIG. 7 illustrates a metadata database for a media library in accordance with some embodiments of the invention. As discussed above, for example, in step 604 of process 600, the client device can retrieve a predetermined number of metadata packets from a server. The metadata packets can be retrieved from a metadata database stored on a server (e.g., server 302A of FIG. 3). In accordance with some embodiments of the invention, metadata database 700 of FIG. 7 is one example of a metadata database from which the client device can retrieve metadata packets.

Metadata database 700 can include one or more types of metadata for a plurality of library entries 702a, 702b, 702c, 702d, etc. For example, each library entry can have the following types of metadata portions: inexpensive metadata portions (e.g., a title of media, author, rating, number of views, a pointer to the associated payload data, a pointer to associated expensive metadata portions, any other suitable parameter, or any combination thereof) and expensive metadata portions (e.g., an image representative of the associated payload data, any other suitable parameter, or any combination thereof).

In some embodiments, the expensive metadata portions and payload data portions for each library entry can be stored on separate servers and/or use a distributed server environment. For example, metadata database can be stored on server 302A, expensive metadata portions can be stored on server 302B, and payload data portions can be stored on server 302C (see FIG. 3). When the metadata database, expensive metadata portions, and payload data portions are stored on separate servers, the metadata for each library entry can store pointers (e.g., URLs) to the corresponding expensive metadata portions and payload data portions stored on servers 302B and 302C (respectively). When a client device needs to access an expensive metadata portion and/or payload data portion associated with a library entry, the client device can use the pointer(s) to that data.

The above described embodiments of the invention are presented for purposes of illustration and not of limitation.

For example, while the description above discusses selectively downloading and presenting graphic data and information (e.g., thumbnails, videos and descriptive text), the present invention can be employed to manage other types of data and information as well. For example, the invention can be used to selectively download other memory-and-bandwidth-intensive data.

Also, while the description above discusses the invention in the context of media libraries, the present invention also can be employed to enable a user to load and browse through any other text and graphic based database. For example, the invention can be employed to manage download and presentation of thumbnail maps for turn-by-turn driving instructions in a GPS or maps application on a mobile device.

Furthermore, although process 600 illustratively includes a number of steps, not all steps of the process are required. For example, the client device can be configured not to store videos in its memory. Instead, each time a user requests access to a video, the client device can be configured to retrieve the video from a server and stream it in real or near-real time.

The present invention is limited only by the claims that follow.

What is claimed is:

1. A computer-implemented method comprising:
  at a computing device with a display and one or more input devices:
    receiving, via the one or more input devices, a request to display a first portion of a list of content without displaying a second portion of the list, wherein:
      the list of content includes a plurality of list entries associated with a first type of metadata that includes text metadata and a second type of metadata that includes graphical metadata;
      the first portion of the list includes a first subset of the plurality of list entries that includes two or more list entries; and
      the second portion of the list includes a second subset of the plurality of list entries that includes two or more list entries;
    in response to the request to display a first portion of the list without displaying the second portion of the list:
      downloading the first type of metadata that includes text metadata for the first subset of the plurality of list entries and the second subset of the plurality of list entries;
      downloading the second type of metadata that includes graphical metadata for the first subset of the plurality of list entries without downloading the second type of metadata for the second subset of the plurality of list entries; and
      displaying, on the display, the first portion of the list by concurrently displaying the first type of metadata for the first subset of list entries and the second type of metadata for the first subset of list entries without displaying the second portion of the list, wherein display of the first portion of the list includes concurrently displaying a plurality of list entries;
    while displaying the first portion of the list on the display, receiving, via the one or more input devices, a request to display the second portion of the list;
    in response to receiving the request to display the second portion of the list:
      displaying, on the display, the first type of metadata for the second subset of the plurality of list entries without displaying the second type of metadata for the second subset of the plurality of list entries; and
      displaying, adjacent to the first type of metadata for the second subset of the plurality of list entries, placeholders for the second type of metadata for the second subset of the plurality of list entries;
    while displaying the first type of metadata for the second subset of the plurality of list entries on the display without displaying the second type of metadata for the second subset of the plurality of list entries, determining whether metadata download criteria have been met; and
    in accordance with a determination that the metadata download criteria have been met:
      downloading the second type of metadata for the second subset of the plurality of list entries; and
      displaying, on the display, the second portion of the list by concurrently displaying the first type of metadata for the second subset of list entries and the second type of metadata for the second subset of list entries.

2. The method of claim 1, wherein the metadata download criteria have been met when the list has stopped scrolling for a threshold amount of time.

3. The method of claim 1, wherein downloading the first type of metadata for the first subset of the plurality of list entries and the second subset of the plurality of list entries includes:
  downloading metadata of the first type for a first entry of the first subset of the plurality of list entries, and
  downloading metadata of the first type for a second entry of the first subset of the plurality of list entries,
  wherein the metadata of the first type for the first entry is distinct from the metadata of the first type for the second entry; and
  downloading metadata of the second type for the first entry of the first subset of the plurality of list entries, and
  downloading metadata of the second type for the second entry of the first subset of the plurality of list entries,
  wherein the metadata of the second type for the first entry is distinct from the metadata of the second type for the second entry.

4. The method of claim 1, wherein displaying, on the display, the second portion of the list by concurrently displaying the first type of metadata for the second subset of list entries and the second type of metadata for the second subset of list entries includes replacing display of the placeholders for the second type of metadata for the second subset of the plurality of list entries with display of the second type of metadata for the second subset of list entries.

5. A computer-implemented system, comprising:
  a display;
  one or more input devices;
  one or more processors; and
  one or more non-transitory computer-readable storage media containing instructions configured to cause the one or more processors to perform operations including:
    receiving, via the one or more input devices, a request to display a first portion of a list of content without displaying a second portion of the list, wherein:
      the list of content includes a plurality of list entries associated with a first type of metadata that includes text metadata and a second type of metadata that includes graphical metadata;
      the first portion of the list includes a first subset of the plurality of list entries that includes two or more list entries; and
      the second portion of the list includes a second subset of the plurality of the list entries that include two or more list entries;
    in response to the request to display a first portion of the list without showing the second portion of the list:
      downloading the first type of metadata that includes text metadata for the first subset of the plurality of list entries and the second subset of the plurality of list entries;

downloading the second type of metadata that includes graphical metadata for the first subset of the plurality of list entries without downloading the second type of metadata for the second subset of the plurality of list entries; and displaying, on the display, the first portion of the list by concurrently displaying the first type of metadata for the first subset of list entries and the second type of metadata for the first subset of list entries without displaying the second portion of the list, wherein display of the first portion of the list includes concurrently displaying a plurality of list entries;

while displaying the first portion of the list on the display, receiving, via the one or more input devices, a request to display the second portion of the list;

in response to receiving the request to display the second portion of the list:

displaying, on the display, the first type of metadata for the second subset of the plurality of list entries without displaying the second type of metadata for the second subset of the plurality of list entries; and displaying, adjacent to the first type of metadata for the second subset of the plurality of list entries, placeholders for the second type of metadata for the second subset of the plurality of list entries;

while displaying the first type of metadata for the second subset of the plurality of list entries on the display without displaying the second type of metadata for the second subset of the plurality of list entries, determining whether metadata download criteria have been met; and in accordance with a determination that the metadata download criteria have been met:

downloading the second type of metadata for the second subset of the plurality of list entries; and displaying, on the display, the second portion of the list by concurrently displaying the first type of metadata for the second subset of list entries and the second type of metadata for the second subset of list entries.

6. The system of claim 5, wherein the metadata download criteria have been met when the list has stopped scrolling for a threshold amount of time.

7. The system of claim 5, wherein downloading the first type of metadata for the first subset of the plurality of list entries and the second subset of the plurality of list entries includes:

downloading metadata of the first type for a first entry of the first subset of the plurality of list entries, and downloading metadata of the first type for a second entry of the first subset of the plurality of list entries, wherein the metadata of the first type for the first entry is distinct from the metadata of the first type for the second entry; and downloading metadata of the second type for the first entry of the first subset of the plurality of list entries, and downloading metadata of the second type for the second entry of the first subset of the plurality of list entries, wherein the metadata of the second type for the first entry is distinct from the metadata of the second type for the second entry.

8. The system of claim 5, wherein displaying, on the display, the second portion of the list by concurrently displaying the first type of metadata for the second subset of list entries and the second type of metadata for the second subset of list entries includes replacing display of the placeholders for the second type of metadata for the second subset of the plurality of list entries with display of the second type of metadata for the second subset of list entries.

9. A non-transitory machine-readable storage medium, including instructions that, when executed by a computing device with a display and one or more input devices, cause the computing device to:

receive, via the one or more input devices, a request to display a first portion of a list of content without displaying a second portion of the list, wherein:

the list of content includes a plurality of list entries associated with a first type of metadata that includes text metadata and a second type of metadata that includes graphical metadata, the first portion of the list includes a first subset of the plurality of list entries that includes two or more list entries; and the second portion of the list includes a second subset of the plurality of list entries that includes two or more list entries;

in response to the request to display a first portion of the list without displaying the second portion of the list:

download the first type of metadata that includes text metadata for the first subset of the plurality of list entries and the second subset of the plurality of list entries;

download the second type of metadata that includes graphical metadata for the first subset of the plurality of list entries without downloading the second type of metadata for the second subset of the plurality of list entries; and display, on the display, the first portion of the list by concurrently displaying the first type of metadata for the first subset of list entries and the second type of metadata for the first subset of list entries without displaying the second portion of the list, wherein display of the first portion of the list includes concurrently displaying a plurality of list entries;

while displaying the first portion of the list on the display, receive, via the one or more input devices, a request to display the second portion of the list;

in response to receiving the request to display the second portion of the list:

display, on the display, the first type of metadata for the second subset of the plurality of list entries without displaying the second type of metadata for the second subset of the plurality of list entries; and display, adjacent to the first type of metadata for the second subset of the plurality of list entries, placeholders for the second type of metadata for the second subset of the plurality of list entries;

while displaying the first type of metadata for the second subset of the plurality of list entries on the display without displaying the second type of metadata for the second subset of the plurality of list entries, determine whether metadata download criteria have been met; and in accordance with a determination that the metadata download criteria have been met:

download the second type of metadata for the second subset of the plurality of list entries; and display, on the display, the second portion of the list by concurrently displaying the first type of metadata for the second subset of list entries and the second type of metadata for the second subset of list entries.

10. The machine-readable storage medium of claim 9, wherein the metadata download criteria have been met when the list has stopped scrolling for a threshold amount of time.

11. The machine-readable storage medium of claim 9, wherein downloading the first type of metadata for the first subset of the plurality of list entries and the second subset of the plurality of list entries includes:
- downloading metadata of the first type for a first entry of the first subset of the plurality of list entries, and
- downloading metadata of the first type for a second entry of the first subset of the plurality of list entries,
- wherein the metadata of the first type for the first entry is distinct from the metadata of the first type for the second entry; and
- downloading metadata of the second type for the first entry of the first subset of the plurality of list entries, and
- downloading metadata of the second type for the second entry of the first subset of the plurality of list entries,
- wherein the metadata of the second type for the first entry is distinct from the metadata of the second type for the second entry.

12. The machine-readable storage medium of claim 9, wherein the instructions that cause the computing device to display, on the display, the second portion of the list by concurrently displaying the first type of metadata for the second subset of list entries and the second type of metadata for the second subset of list entries include instructions that cause the computing device to replace display of the placeholders for the second type of metadata for the second subset of the plurality of list entries with display of the second type of metadata for the second subset of list entries.

* * * * *